MAGNETIC CORE MATRIX ADDER AND SUBTRACTER

Filed June 20, 1962 3 Sheets-Sheet 1

INVENTORS
JEAN BORNE
JACQUES GOLFIER
HERMAN J. HEIJN
BY [signature]
AGENT

MAGNETIC CORE MATRIX ADDER AND SUBTRACTER

Filed June 20, 1962 3 Sheets-Sheet 2

INVENTORS
JEAN BORNE
JACQUES GOLFIER
HERMAN J. HEIJN
BY
Frank R. Trifari
AGENT

Oct. 27, 1964 J. BORNE ETAL 3,154,677

MAGNETIC CORE MATRIX ADDER AND SUBTRACTER

Filed June 20, 1962 3 Sheets-Sheet 3

INVENTORS
JEAN BORNE
JACQUES GOLFIER
HERMAN J. HEIJN

BY Frank R. Jifoni
AGENT 3,154,677

MAGNETIC CORE MATRIX ADDER AND SUBTRACTER

Jean Borne, Saint-Maur (S), and Jacques Golfier, Paris, France, and Herman Jacob Heijn, Geldrop, Netherlands, assignors to Laboratoires d'Electronique et de Physique Appliquees L.E.P. (Societe Anonyme), Paris, France Filed June 20, 1962, Ser. No. 203,816
Claims priority, application France June 20, 1961
3 Claims. (Cl. 235—176)

This invention relates generally to electronic addition or subtraction circuits (comprising electronic tubes, transistors, or magnetic cores) for series operated calculating machines. Series operation denotes that the machine operates successively on pairs of digits of the same order of the two numbers to be added together or to be subtracted from one another, by beginning with the lowest order and progressing upward therefrom.

Addition and subtraction circuits operating in the binary system of numeration, made up of combinations of electronic flip-flops, are already known: the flip-flops receive the binary digits, which are represented by pulses, and deliver the result in the form of a voltage having a high or low level.

When the operations are to be carried out in a system differing from the binary, for instance in the decimal system a code with bivalent elements, sometimes called binary coded decimal, is used and it is possible to use flip-flops to make a decimal operator that operates on figures thus coded. This decimal operator is however necessarily rather complicated and is subject to a limited operating frequency.

The invention is based on a different principle and allows the construction of a relatively simple device and the attainment of high operating frequency. Broadly speaking, the addition and subtraction device according to the invention simultaneously receives in coincidence, with a very simple coding in position on its several inputs, pulses that represent the figures to be added and also produces practically instantaneously the resulting figure that is position coded on its outputs in a like manner.

The improvement in speed of operation is so great that it is possible to perform the operations in series, thus taking advantage of the structural simplicity of the latter type of operation.

In order to appreciate the operation of the system according to the invention, assume first that the device operates in the binary system; it will then comprise a first pair of inputs for one of the figures to be introduced, a second pair of inputs for the other figure to be introduced, and a pair of outputs for the resulting figure which appears practically instantaneously when an input has been fed to both pairs of inputs.

Assuming alternatively that the device operates in the decimal system coded in the biquinary form, it would comprise a group of inputs consisting of five inputs (which corresponds to quinary coding) plus two further inputs (which corresponds to binary coding) for one of the operands and in a like manner a second group of respectively five and two inputs for the other operand; one input is fed to the group of five inputs and another input is fed to the group of two inputs, the result then appearing practically instantaneously.

The equivalent in the decimal system coded in biquinary form may be achieved by using respectively four and one inputs in place of the above five and two inputs if the figure zero is not represented. But it is preferable to provide seven inputs as above indicated in order to be able to check possible errors.

In an addition or substraction operation the result of the operation on every pair of figures that pertain respectively to the two operands must be combined with the carry resulting from the operation on the lower order digits. This generally greatly complicates the structure of devices which include provision for handling these carries.

A primary object of the invention is to provide a relatively structurally simple series operated calculating machine having a high operating speed. Another object of the invention is to provide an adding and/or subtracting device operating in the decimal system which has a limited number of parts and is therefore economical to manufacture.

In a known parallel operating calculating machine using the binary system wherein digits of different orders are grouped and for each group of orders a particular adder operates on each corresponding group of pairs of operand figures as well as on the corresponding carries, it is already known to make each adder of two parts that operate independently, one executing exactly the addition on said group of figures and the other the addition increased by one, while means are provided to select one of the two addition results, the selection being controlled by the carry resulting from the addition of the immediately lower order. This type of machine is thus based on the principle of the quasi-simultaneous transmission of the different carries of each order to the next one and eventually in cascade for several orders; it is also based on the effective operation of each adder part in which only the output of one of the adder parts is blocked by a carry.

Similarly to the parallel operating device, the invention provides adding and subtracting circuits that operate with pulses representing the successive figures of the two operands, and comprises two parts, one of which executes exactly the operation and the other of which executes the operation with an increase of one, both said parts being simultaneously fed by said pulses and both feeding to one output; means are also provided for using only the result delivered by one of said parts. Among other distinguishing features, however, according to the invention the pairs of figures of the two operands are introduced into the device sequentially and a bistable memory unit is included for receiving the pulses that represent the carries and to control inhibiting means in the interval of time between the introduction of two successive pairs of figures, said control inhibiting one of said parts in response to the last carry stored in said memory unit.

In accord with the foregoing, therefore, the invention has the following additional objects:

To provide an adder including two parts constituted substantially as set forth above;

To provide a subtracter including two parts constituted substantially as set forth above; and To provide an adder-subtracter combination including a plurality of parts as set forth above.

In the combined adder-subtracter according to the invention there are provided a combination of four operators of the same type (preferably four adders of the same type), i.e., an operator that executes the addition of two operands, another operator that executes an addition of two operands but increased by 1, a third operator that executes the subtraction of two operands, preferably by adding the subtrahend transformed by complementing to the numeration basis diminished by 1 and a fourth operator that executes the same subtraction but increased by 1, all operators being simultaneously fed by the pulses representing the figures of the same order of the two operands and connected to one output, in cooperation with inhibiting means which at a particular instant prevent the operation of three out of the four operators, so that at any particular time only one operator operates and delivers the result at the output terminals.

Moreover it is advantageous according to the invention to use for building such an operator (and also preferably every one of the operators) a matrix arrangement of $n \times n$ magnetic cores having two distinct series of $n$ inputs each coupled to $n$ cores, said matrix working through coincidence of respective pulses on two inputs pertaining to different series, each output winding of a core being connected in series with $n-1$ other output windings of other cores.

For achieving the material construction of such a matrix it is advantageous to make use of a flat thin insulating frame, preferably of a square form, which is constituted by four connecting bars and to insert magnetic cores by means of connecting wires inside said frame, each core having the shape of very minute toroids; the connecting wires are part of the core windings, which are simply wires passing through the cores and, by crossing one another, maintain the cores in place. Matrices thus obtained which are only a few millimetres thick and whose sides have a length of only a few centimetres do not require much space and are easily stocked or piled up together.

The invention also provides for matrices of a like type comprising essentially magnetic cores with two distinct series of $n$ inputs and one series of $n$ outputs, operating by coincidence, in which each output winding of a magnetic core of one of the matrices is connected in series with $n-1$ other windings of the same matrix as well as with the $n$ homologous windings of each of the other matrices, one of the matrices being provided for addition without carry, another for addition with carry, the third for subtraction without carry and the fourth for subtraction with carry, inhibiting means being provided to allow operation of only one matrix at a time and preferably including inhibiting windings.

Another object of the invention is to provide a device working in the biquinary system which comprises two quinary operating parts, namely an adder and another adder carrying out an addition increased by 1, means for detecting certain predetermined associations of the quinary components of the figures of the operands, means for simultaneously introducing into said operating parts the quinary components of the successive figures of the two operands, a binary adder, means for introducing into said binary adder the binary components of the successive figures of the two operands, a memory unit for at least momentarily storing the carry produced by the quinary operating parts, means operating in response to the condition of the memory unit for inhibiting either one of the quinary adders, and a correcting unit for modifying the results from the binary adder; the associations are predetermined and the correcting unit is correspondingly adapted to carry out logical appropriate functions so that the results after passing through said correcting unit are equivalent to those that operating tables would give by directly operating in the decimal system.

The invention will be better understood by referring to the following description and the accompanying drawings, wherein.

Figure 1:
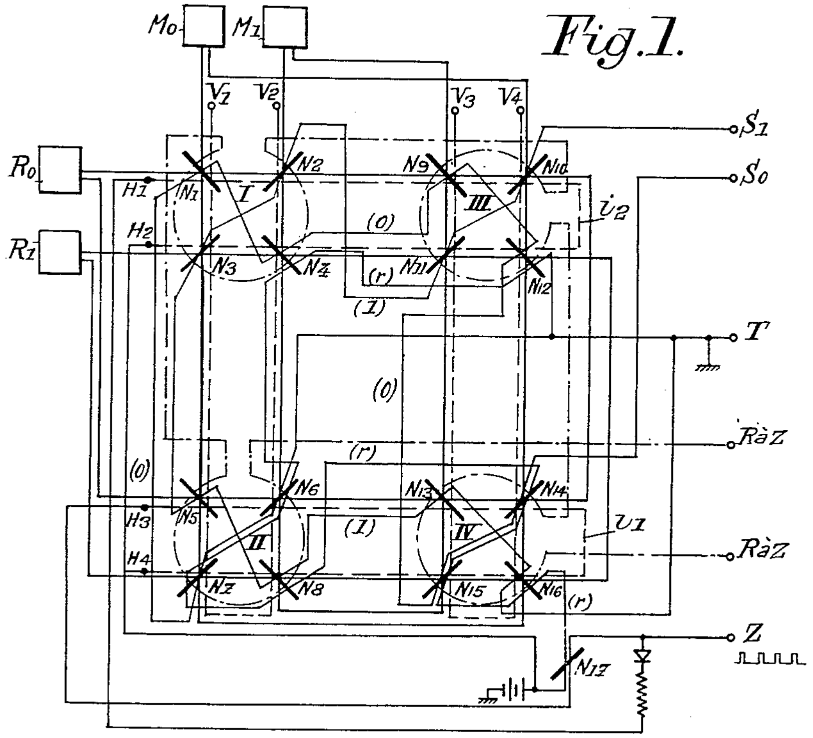
FIG. 1 illustrates an example of an operator according to the invention, utilizing the binary system.

Referring first to FIG. 1, the device of the invention comprises four elementary operators I, II, III, IV, each including four magnetic cores; only one operator is active at a time due to inhibiting means which will be discussed in detail below.

Operator I forms the sum of two binary digits when the carry due to the foregoing addition is a zero; it includes the cores N1, N2, N3, N4. Operator II forms the sum of two binary digits when said carry is one, i.e., it yields the result that the operator I would furnish, but with an increase of 1, and it includes the cores N5, N6, N7, N8. Operator III forms the difference between two digits (accomplished as an addition to the complement to the numeration basis diminished by 1) and includes the cores N9, N10, N11, N12, while operator IV delivers the same difference increased by 1 and includes the cores N13, N14, N15, N16. Although not considered as a limitation to the invention, it is advantageous to arrange the cores in each operator along two columns and two rows, the cores being relatively positioned so as to reduce electro-magnetic couplings to a minimum. Each of the cores carries several windings, represented only by intersecting lines, which are generally constituted by a single turn or even by a single wire passing through the core. The windings are grouped and connected together, preferably in series, in different circuits. A first series of circuits relates to energization of the cores by electric pulses delivered by sources M0, M1 for the columns and R0, R1 for the rows. Thus M0 is capable of feeding in series N1, N3, N5, N7, N16, N14, N12, N10; M1: N2, N4, N6, N8, N15, N13, N11, N9; R0: N1, N2, N9, N10, N14, N13, N6, N5; R1: N3, N4, N11, N12, N16, N15, N8, N7.

The pulse delivered by M0 corresponds to the value 0 of one of the two digits introduced in the adder-subtracter, whereas the pulse furnished by M1 corresponds to its value 1; in an analogous manner, the pulse furnished by R0 corresponds to a value 0 (and the one delivered by R1 to the value 1) for the other digit which is simultaneously introduced.

Thus is obtained, for every pair of introduced digits and at the crossing point of a line and a column, the reversal of the state of a core (for the state of a core can only be reversed if the column and line circuits of the windings to which it pertains are simultaneously energized).

This reversal is manifested by producing a pulse in a special winding provided on each core for the purpose and which can be called an output winding. All the output windings of the four elementary operators which respectively correspond to a digit of the same value are connected together and preferably in series. As the device of FIG. 1 operates in the binary system there are two outputs S0 and S1 which respectively correspond to the digits 0 and 1 for the result. The circuit of S0 passes via the output windings of the cores N6, N7, N1, N4, N9, N12, N15, N14, whereas the circuit of S1 passes via the output windings of the other cores, N10, N11, N2, N3, N5, N8, N13, N16; these circuits are respectively indicated by (0) and (1). The reasons why the connections are so made will appear from what follows.

Let us consider first the operator I which corresponds to a binary addition table for adding two digits A and B:

| | B: 0 | B: 1 |
|---|---|---|
| A: 0 | 0 | 1 |
| A: 1 | 1 | 0+ |

In this table, sign + means that a carry is produced which must play a role in the operation on the digits of the immediately higher order. Consequently the output windings of N2, N3, are connected in series in the same circuit (1) connected to S1 and the output windings of N1 and N4 are in a circuit (0) connected to S0: the second output winding particular to N4 and which can be called a carry winding is in a circuit ($r$) that feeds to the control winding of a commutator core N17. This core N17 works in the same manner as core N1, N2, FIG. 1, illustrated in a prior patent application Serial Number 93,489 of March 6, 1961.

In a like manner operator II effectuates a binary table which can be deduced from the above table by adding a carry +1 to every digit of the result for forming the final sum:

| | 0 | 1 |
|---|---|---|
| 0 | 1 | 0+ |
| 1 | 0+ | 1+ |

Thus the normal output windings of N6 and N7 are in the circuit that feeds to S0 and those of N5 and N8 feed to S1; the particular carry windings of N6, N7, N8 are in series in the circuit ($r$) and feed to the control winding of the commutating core N17.

Operator III (N9, N10, N11, N12) is a subtracter.

This operator could be established for directly carrying out the subtraction $A—B$. For providing similarity with the embodiment adapted to the decimal system and described below, it is preferable, in particular for avoiding wiring errors, to adopt the known method which consists in making use of an adder, while first of all the complement of each of the figures of subtrahend B is taken, with respect to the base (2 here) −1 of the numeration system, except for the first figure which is increased by 1 in the machine according to the end around carry method. This is very easily obtained by starting from the above adder without a carry and by mutually exchanging the column inputs of the subtracter, which gives:

| | | B | |
|---|---|---|---|
| | | 1 | 0 |
| A | 0 | 0 | 1 |
| | 1 | 1 | 0+ |

Each particular digit formed by this operator cannot be interpreted as if it were in itself the result of the subtraction of the two corresponding operand digits, for the entire result, i.e. the number formed by all of the digits, may need a revision; this, per se, is well-known in the art.

Moreover it must be understood that such an operator (and this is the case also for operator IV which will be discussed further on) operates correctly for all orders, except for the first which must be increased by 1 due to means known per se provided in the machine, this known arrangement being outside the scope of the invention.

Consequently the output windings N10 and N11 feed to S1, those of N9 and N12 to S0 and particular winding of N12 is connected in the circuit ($r$) of the control winding N17.

Finally operator IV corresponds to the table

| | | B | |
|---|---|---|---|
| | | 1 | 0 |
| A | 0 | 1 | 0+ |
| | 1 | 0+ | 1+ |

which is obtained by exchanging the vertical inputs of the table of operator II. Here the output windings of N14 and N15 feed to S0, those of N13 and N16 to S1 and the particular windings for controlling the carry of N14, N15, N16 are in the circuit ($r$) of the control winding of N17.

It must be remarked here that the carry in question, in a subtraction called with a carry, is the one that is produced in the addition carried out by an adder that operates on a subtrahend which is complemented as above defined; this carry must not be confused with the one that is sometimes unproperly named in a subtracting operation and which is in fact a borrow of one unity to the adjacent figure on the left side, of the subtrahend.

Circuit ($r$) thus passes via the particular output windings for the carries of cores N12, N4, N6, N7, N8, N14, N15, N16 and ends finally in core N17.

The commutating core N17 receives a continuous series of pulses on its second winding and said pulses, in phase with those of the input figures, are delivered therefore by a source Z. The pulses in question feed normally to said second winding of the core N17 and to the horizontal inhibit windings of all the cores of operators II and IV, all connected in series for inhibiting additions or subtractions with a carry, a circuit $i1$ (drawn in broken lines) being thus formed and passing via H3, H4. If a carry is generated by one of the windings of circuit ($r$), the state of core N17 is reversed. As the latter offers then a great impedance the next pulse follows a shunt circuit which inhibits, through a like circuit $i2$ similar to the circuit 21 but passing via H1, H2 (in broken lines), the operators I, III without a carry; at the same time the state of core N17 is reversed. Delay elements (which are not represented) could be connected in series with the windings of the circuit ($r$) that control core N17.

In addition, inhibiting circuits (also in broken lines) passing via V1, V2 and V3, V4 and the respective vertical inhibit windings, which are associated with sources (not shown) and switching means, allow a choice between addition and subtraction, so that finally only one of the four operators is working. Now a zeroizing circuit $RaZ$ connecting together special windings of all the cores N1 to N16 without exception permits restoration of the reversed cores to rest state, due to means (not shown) which produce pulses that are interspersed with those of the operand digits.

From the foregoing it is seen that each core is provided with seven windings in total, namely: two energization or input windings (i.e., one for the line and one for the column), one output winding for the result, one output winding for the carry, two inhibit windings (a so called vertical one and a so called horizontal one) and a zeroizing winding. The number of windings is of course not limitative of the invention and some of them could be combined or divided.

In the case of an operator for the decimal system of numeration, an appropriate operating unit could be established on the same principles, with four operators that would have functions similar to those just described, it being supposed that these operators work in the decimal system.

It is however more economical and just as efficient to code the decimal figures in a biquinary fashion. Every figure is then constituted of a binary part and of a quinary part and it will be seen that it is sufficient to combine four quinary operators endowed with the different functions which have been enumerated above and a group of logical circuits working in the binary system, under the condition that said logical circuits be controlled by means sensitive to certain associations of quinary figures in the two operands.

In the biquinary system, as it is well known by itself, any decimal figure can be represented by $x+5y$, $x$ having a value 0, or 1, 2, 3, 4 and $y=0$ or 1.

Figure 2:
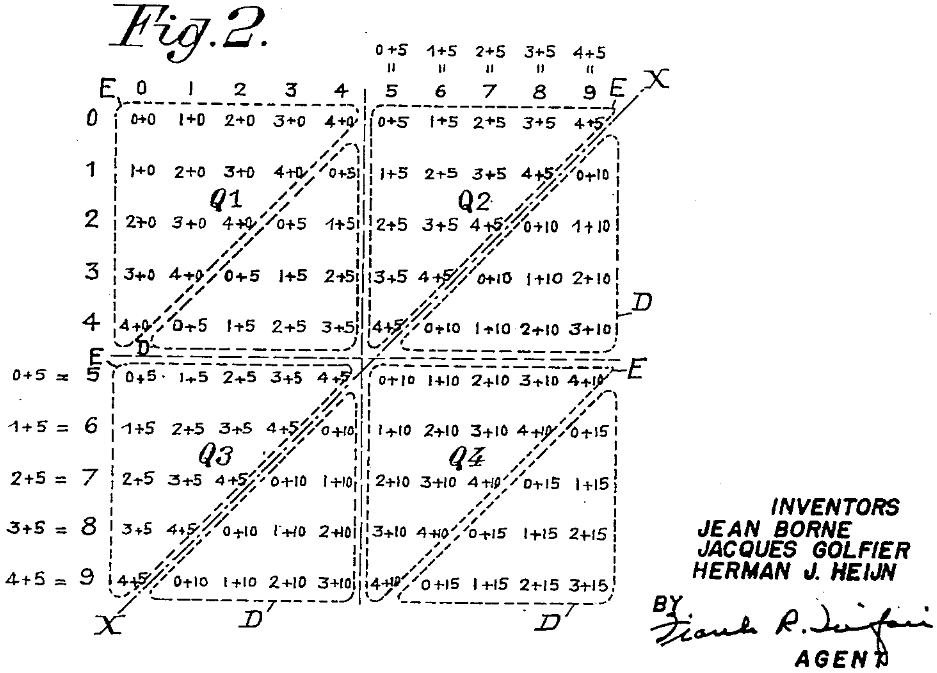
FIG. 2 is a decimal addition table for arithmetic calculations, expressed in the biquinary form.

When the decimal addition table is established by using figures so represented the table of FIG. 2 is obtained.

This table is divided into four equal quadrants Q1, Q2, Q3, Q4 by a broken line cross. Each of said quadrants is a quinary table of the ordinary model; the "$x$" being only taken into account. The table is as follows:

| | 0 | 1 | 2 | 3 | 4 |
|---|---|---|---|---|---|
| 0 | 0 | 1 | 2 | 3 | 4 |
| 1 | 1 | 2 | 3 | 4 | 0+ |
| 2 | 3 | 3 | 4 | 0+ | 1+ |
| 3 | 3 | 4 | 0+ | 1+ | 2+ |
| 4 | 4 | 0+ | 1+ | 2+ | 3+ |

(the sign + adjoined to some of the results having here a value 5, 10 or 15 according to the quadrant concerned).

Supposing now that only the element "$y$" of FIG. 2 are considered and neglecting the carries, one notices that said elements are: either given out by a binary addition table (where the 1 has a value 5):

| | 0 | 1 |
|---|---|---|
| 0 | 0 | 1 |
| 1 | 1 | 0 |

which could be written also, as explained later on:

| | 0 | 1 |
|---|---|---|
| 0 | $\alpha$ | $\beta$ |
| 1 | $\beta$ | $\alpha+\gamma$ |

either the same results of this binary table, but exchanged, "y" having the value 0 instead of 1 and reciprocally. This happens only in FIG. 2 in the triangles D encircled by a broken line; each quadrant comprises such a triangle D, located in a similar manner for every quadrant. The triangles complementary to D in said quadrants are designated by E.

Under those conditions it will be seen that for making an adder working in the decimal system of numeration it is possible to use the combination of a quinary addition table of the matrix type and a binary addition table—the first table operating on the quinary components of the figures and the second one on their binary components—together with particular correction means for correcting the binary results, said correction means being controlled for instance by a special supplementary winding provided on each of the magnetic cores in zone D.

It is also necessary to generate a decimal carry pulse for all the results situated in FIG. 2 in the region at the right of the diagonal X—X (which separates the values 9 and 10). Said region comprises the whole of the quadrant Q4 (for which both "y" operand figures are equal to 1) and the two triangles D of quadrants Q2 and Q3 (having "y" operand figures of reverse values, 0 and 1).

Figure 4:
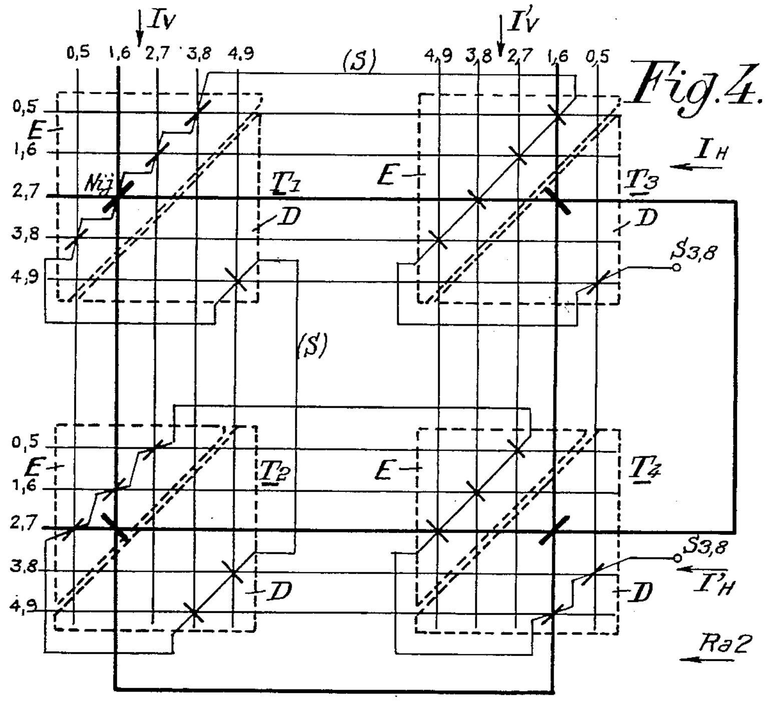
FIG. 4 shows details of the quinary operators incorporated in FIG. 3.
Figure 3:
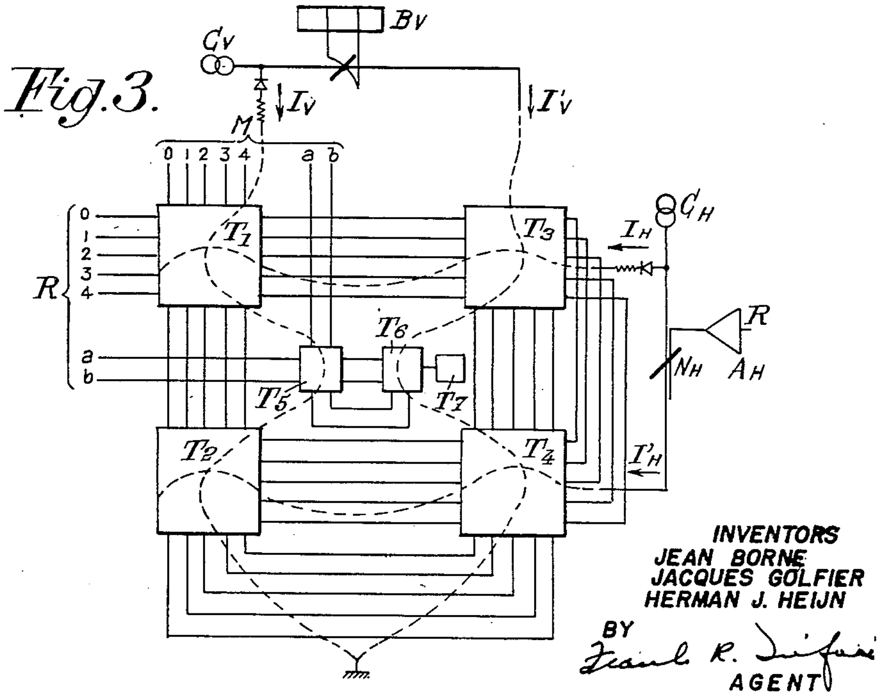
FIG. 3 is a synoptic diagram of an operator according to the invention utilizing the biquinary code.
Figure 5:
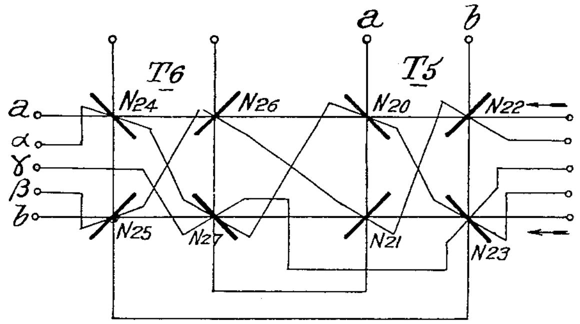
FIG. 5 shows the binary operators incorporated in FIG. 3.
Figure 6:
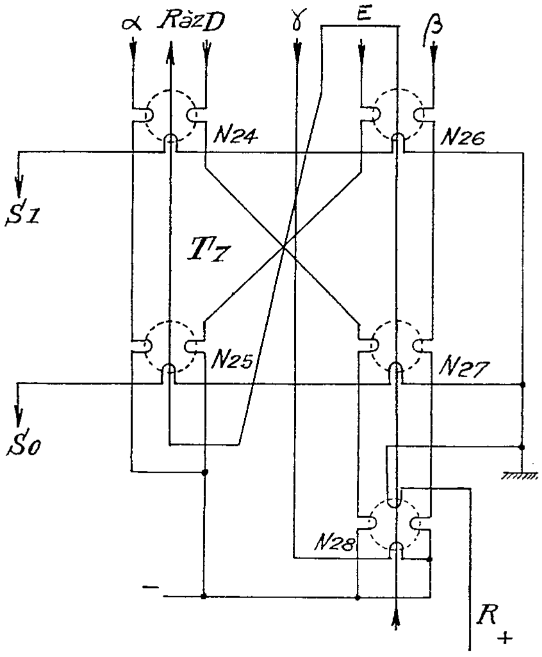
FIG. 6 illustrates logical circuits incorporated in FIG. 3.

A complete adder-subtracter in accordance with the invention, for operating in decimal numeration coded in a biquinary mode is shown in block form in FIG. 3; more details are shown in FIGS. 4, 5 and 6.

In this adder-subtracter there are to be found:

A normal quinary addition table T1;
A quinary addition table T2 with an increase by 1;
A normal quinary subtraction table T3;
A quinary subtraction table T4 with an increase by 1;
A binary addition table T5;
A binary subtraction table T6;
And a binary correction circuit T7.

The figures to be added or subtracted respectively originate from a memory M and a register R (not shown) and are transmitted in the form of a pulse which is positioned on one of five channels numbered 0 to 4 according to a quinary representation and of a pulse positioned either on *a* or *b* according to a binary representation; the pulses from M are applied to the column inputs and the pulses from R to the line inputs. Tables T1, T2, T3, T4 have advantageously the same constitution, with the exception of a few modifications in their internal wiring as will be explained further on and the input line connections for every figure to be entered are in series for the four tables; the same applies to the columns, but a column which corresponds in T1 and T2 to a certain figure, for instance 3, is connected in series to the complementary column with respect to base 5 of T3, T4, for instance 1 in the present case, which produces the exchange of the connections in a way similar to what has been made in FIG. 1 for the binary representation. The binary tables T5 and T6 are built quite similarly to the respective operators III and I, but their outputs are connected to the correction circuit T7 (shown in detail in FIG. 6) which will be discussed hereinafter.

The addition tables T1, T2, T3, T4 are built up in a manner similar to FIG. 1 by matrix groupings of magnetic cores arranged in lines and columns; every core, for instance N*ij*, possesses also here seven windings, namely:

A column input winding (these windings are connected to each other in series for every column, for instance 1, 6 in heavy solid line, FIG. 4);

A line input column (these windings are connected to each other in series for every line, for instance 2, 7 in heavy solid line, FIG. 4);

An output winding; these windings are series connected to the four windings that deliver the same quinary result (which are situated in the same diagonal or eventually in another diagonal comprising a number of windings complementary to four) and to the homologous output windings of the other tables. This circuit S is connected to output terminals such as S3, 8 which correspond to a same result for all these windings; it may be remarked that one finds in a same circuit S, for instance, two diagonal portions in table T1 and the same diagonal portions in table T3 and also other diagonal portions in tables T2 and T4 which correspond to a shift of one line upwards of said diagonals;

A supplementary output winding which marks the origin from a region D or from a complementary region E. The diagonal that limits these regions is shifted by one line upwards from T1 to T2 or from T3 to T4 and all the windings of the D regions are in series as well as respectively all the windings of the E regions (these windings and the corresponding circuits have not been represented in FIG. 4 in order to simplify the drawings;

A vertical inhibit winding;
A horizontal inhibit winding;
A zeroizing winding.

All the zeroizing windings of the four tables T1 to T4 are connected in series and to the R*a*Z terminals. The so called vertical inhibit windings of the tables T1 and T2 are all series connected according to the diagram of FIG. 4 and symbolically referred to by the arrow $I_V$; in a similar way are indicated those of the tables T3 and T4 by the arrow $I'_V$. Similarly for the horizontal inhibition those of the tables T3 and T4 are indicated by the arrow $I_H$, and those of the tablets T2 and T4 by the arrow $I'_H$.

The memory M and the register R deliver pulses having an amplitude $H/2$ and in the case of coincidence of two such pulses, which is equivalent to a sufficient amplitude H, the state of the core, for instance N*ij*, situated at the crossing of the corresponding line and column is reversed and the pulse originating from this state reversal is collected at the corresponding output terminals, for instance $S_{3,8}$. Zeroizing of the cores is ensured by sending pulses of contrary direction and having an amplitude H, applied on the terminals R*a*Z.

The wires corresponding to $I_H$, $I'_H$, $I_V$, $I'_{V'}$, may be fed with pulses having the same direction as the zeroizing pulses, but with an $H/2$ amplitude, the whole being arranged so that only one table T1, T2, T3, T4 be in operating condition. To this end pulses are produced by sources $C_V$, $C_H$ (FIG. 3) in association, for every source, with a respective commutator core $N_V$, $N_H$ of the same model as mentioned with respect to core N17 of FIG. 1.

$N_V$ is controlled by an electronic flip-flop $B_V$, while $N_H$ is controlled through the intermediary of an amplifier $A_H$ by the preceding carry. The output wires may be established with an alternate direction through the cores so as to avoid or reduce spurious signals since the spurious pulses are of opposite sign and they counterbalance each other; however, a symmetrical output amplifier is necessary when this is done.

The binary addition table T5 (FIG. 5) is built up with cores $N_{20}$, $N_{21}$, $N_{22}$, $N_{23}$ so as to effectuate the already mentioned table:

| | 0(*a*) | 1(*b*) |
|---|---|---|
| 0(*a*) | $\alpha$ | $\beta$ |
| 1(*b*) | $\beta$ | $\alpha+\gamma$ |

according to the principles already given in explaining the working of the table of FIG. 1. The associated subtraction table T6 is obtained by exchanging the vertical inputs 0 and 1, while its internal disposition remains the same. The corresponding inhibit circuits (which are not shown here) cooperate with the already described circuits $I_V$ and $I'_V$. The zeroizing circuit of tables T5 and T6 has not been shown in FIG. 5 by way of simplification.

Beyond the tables T5, T6 and with the intermediary of eventual transistor stages (not represented) is a logical correction circuit which comprises five cores (FIG. 6). This circuit carries out the following logical operations;

$(\alpha+E)$ or $(\beta+D)=0$
$(\alpha+D)$ or $(\beta+E)=1$
$(\beta+D)$ or $\gamma=1$ (decimal carry R)

In a practical embodiment the two input windings and the output winding of cores $N_{24}$ to $N_{27}$ are of ten turns each. When $N_{24}$ simultaneously receives $H/2$ pulses on its traversing circuits $\beta$ and D, the state of $N_{24}$ is reversed and it delivers a pulse on terminal S1 having a value of a binary 1 (that is, a decimal 5). In a like manner $N_{26}$ translates the coincidence of $\alpha$ and E. On the S0-terminal are similarly collected the coincidences of $\alpha$ and D produced by $N_{27}$ and $\beta$ and E produced by $N_{25}$.

The cores cannot be reversed by a single pulse having $H/2$ amplitude. The core $N_{28}$ has a ten turn winding for receiving the $\alpha$ pulses, a ten turn winding for receiving the D pulses and a twenty turn winding for receiving the $\gamma$ pulses. Thus it is capable of having its magnetic state reversed either by an $\alpha+D$ coincidence or under the influence of $\gamma$ alone. The carry pulse R is applied, after amplification and derivation (in order to produce a slight delay), to the switching core $N_H$ (FIG. 3).

The cores of FIGURE 6 are also provided with a zeroizing circuit R*a*Z. While there hase been described what are at present considered to be the preferred embodiments of the invention, it will be apparent that various modifications and other embodiments thereof will occur to those skilled in the art within the scope of the invention. In particular it is obvious that the above described operation in the biquinary system of numeration can be limited either to true adders or to true subtracters by omitting what is concerned respectively with subtracting or adding parts. Accordingly we desire the scope of our invention to be limited only by the appended claims.

What we claim is:

1. A device for executing additions and subtractions, comprising the combination of four electric operators, i.e., an exact adder operating on successive pairs of pulses for the addition of an addend and an augend, another adder for executing the same addition but increased by 1, a subtracter operating on successive pairs of pulses for the subtraction of a minuend and a subtrahend, and another subtracter for executing the same subtraction but increased by 1, means for simultaneously feeding pairs of pulses corresponding to the respective figures of the operands, means for connecting the outputs of said operators to a common output, and means for inhibiting three of the operators so that only one operator operates at a time and feeds to the common output, all of said four operators being of the same adder type.

2. A device for performing addition of two operands in the decimal system in a biquinary form, comprising: a first quinary adder delivering a quinary sum and a second quinary adder delivering a quinary sum increased by 1, detecting means for detecting predetermined associations of the quinary components of the figures of the two operands, means for simultaneously introducing into said quinary adders the quinary components of the successive figures of both operands, a binary adder, means for introducing in said binary adder the binary components of the successive figures of both operands, a memory unit for temporarily storing the carries produced by the quinary adders inhibiting means for inhibiting either of said quinary adders under control of said memory unit, and a correction device, under control of said detecting means, for changing the results of the binary adder according to a predetermined logical law.

3. A device for performing addition and subtraction on two operands in the decimal system in a biquinary form, comprising four quinary operators constructed as matrix adders, input means for simultaneously applying in the form of electric pulses the quinary components of the successive figures of both operands, one pair of said adders sequentially receiving on its corresponding inputs the pulses corresponding to the figures while the other pair of said adders simultaneously receives said pulses on inputs corresponding to the complements to 4 of the figures, output means arranged such that for each said pair an adder delivers an exact sum and the other adder the sum is increased by 1, detecting means for detecting predetermined associations of the quinary components of the operands, two similar binary adders, means for simultaneously introducing into the two said binary adders respectively the binary components of the successive figures of both operands but exchanged 1 for 0 and 0 for 1, inhibiting means for alternately inhibiting either one pair or the other of the adders and either one or the other of said binary adders, depending on the calculation desired, a memory unit for storing the carries produced by the quinary adders, inhibiting means under control of said memory unit for inhibiting either one or the other of said quinary adders of each part, and a correction device operating in response to said detecting means for changing the results of the binary adders according to a predetermined logical law.

References Cited in the file of this patent

UNITED STATES PATENTS 2,967,665 Einsele ---------------- Jan. 10, 1961